(12) United States Patent
Chang

(10) Patent No.: US 9,365,240 B2
(45) Date of Patent: Jun. 14, 2016

(54) FRONTAL COLLISION IMPACT ABSORBING DEVICE FOR VEHICLE

(71) Applicant: Hyundai Motor Company, Seoul (KR)

(72) Inventor: Hoon Chang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 13/926,996

(22) Filed: Jun. 25, 2013

(65) Prior Publication Data

US 2014/0159423 A1      Jun. 12, 2014

(30) Foreign Application Priority Data

Dec. 10, 2012   (KR) .......................... 10-2012-0143087

(51) Int. Cl.
  *B62D 21/15*    (2006.01)
  *B62D 25/16*    (2006.01)

(52) U.S. Cl.
  CPC .............. *B62D 21/152* (2013.01); *B62D 25/16* (2013.01)

(58) Field of Classification Search
  CPC ............................. B62D 21/152; B62D 25/16
  USPC ...................................................... 296/187.09
  See application file for complete search history.

(56) References Cited

U.S. PATENT DOCUMENTS

| 6,598,933 B2 * | 7/2003 | Taguchi et al. ........... 296/203.02 |
| 7,461,890 B2 * | 12/2008 | Yatsuda .................... 296/203.02 |
| 8,398,154 B1 * | 3/2013 | Nusier et al. ................ 296/187.1 |
| 2013/0043087 A1 * | 2/2013 | Mildner ......................... 180/291 |

FOREIGN PATENT DOCUMENTS

KR    20-0228004 Y1    12/2001

* cited by examiner

*Primary Examiner* — Glenn Dayoan
*Assistant Examiner* — Melissa A Black
(74) *Attorney, Agent, or Firm* — McDermott Will & Emery LLP

(57) ABSTRACT

A device for absorbing frontal collision impact for a vehicle includes side members extending in the length direction of the vehicle and impact-absorbing structures mounted on the side members and protruding outward in the width direction of the vehicle. The device can effectively cope with a frontal small offset collision of a vehicle.

8 Claims, 6 Drawing Sheets

FRONTAL COLLISION IMPACT ABSORBING DEVICE FOR VEHICLE

CROSS-REFERENCE TO RELATED APPLICATION

This application is based on and claims benefit of priority to Korean Patent Application No. 10-2012-0143087, filed in the Korean Intellectual Property Office on Dec. 10, 2012, the entire contents of which are hereby incorporated by reference.

TECHNICAL FIELD

The present disclosure relates to a device for absorbing impact for a vehicle. More particularly, the present disclosure relates to a device for absorbing frontal collision impact for a vehicle which can effectively cope with a small front-offset collision.

BACKGROUND

In general, a device to absorb impact for a vehicle is mounted on the front and the rear in the length direction of a vehicle to keep passengers safe by absorbing shock caused by a collision with a pedestrian, another vehicle, an object, or simultaneously, and to minimize deformation of the vehicle.

Referring to FIG. 1, a device to absorb impact for a vehicle of the related art includes a bumper beam 10 formed in a beam shape and disposed in the width direction on the front and the rear of a vehicle and crash boxes 30 to mount the bumper beam 10 on side members 20 extending in the length direction of the vehicle.

The side members 20 are connected with side reinforcing members 40 extending in the length direction of the vehicle and the side reinforcing members 40 are disposed further out in the width direction of the vehicle than the side members 20.

A dash panel 50, which extends in the width direction of the vehicle and divides the engine room and the interior of the vehicle, is disposed at the joints of the side members 20 and the side reinforcing members 40.

Further, tires 60 of wheels extend further out than the bumper beam 10 in the width direction of the vehicle in areas between the side reinforcing members 40 and the side members 20 in the width direction of the vehicle.

The bumper beam 10 and the crash boxes 30 serve to absorb and attenuate the impact that is applied during a frontal collision of the vehicle.

When the vehicle makes a 25% offset collision (hereafter, referred to as a small offset collision) with a struck object 70 such as a crash barrier in the front area, the struck object 70 could hit the outside areas between the side members 20 and side reinforcing members 40.

An appropriate structure or device for absorbing impact is not provided in the outside areas, such that if the struck object 70 directly hits the tires 60 of the wheels, and the collision keeps progressing, the struck object 70 and the tires 60 of the wheels would hit the dash panel 50 and the side reinforcing members 40, such that dash panel 50 and the side reinforcing members 40 are largely deformed. Accordingly, this can create a dangerous situation to passengers.

The above information disclosed in this Background section is only to enhance the understanding of the background of the present disclosure and is not intended to mean that the present disclosure falls within the purview of the related art that is already known to those skilled in the art.

SUMMARY

The present disclosure has been made in an effort to provide a device to absorb frontal collision impact for a vehicle and have advantages of being able to keep passengers safe during a small offset collision of a vehicle with a struck object in the front area.

An exemplary embodiment of the present disclosure provides a device to absorb frontal collision impact for a vehicle, which may include: side members extending in the length direction of a vehicle; and impact-absorbing structures mounted on the side members and protruding outward in the width direction of the vehicle.

The impact-absorbing structures may be disposed ahead of the tires of wheels in the length direction of the vehicle.

The impact-absorbing structures may protrude outward further than a bumper beam in the width direction of the vehicle.

The impact-absorbing structures may each include: a first protrusion mounted on the side member and protruding in the width direction of the vehicle; a second protrusion protruding behind the first protrusion in the length direction of the vehicle; and an impact-absorbing member connecting the first protrusion with the second protrusion and protruding rearward further than the second protrusion in the length direction of the vehicle.

The first protrusion and the second protrusion may be connected by a mounting member mounted on the side member.

The first protrusion may include a triangular first support bracket with one end mounted on the mounting member and the other end mounted on the side member, the second protrusion may include a second support bracket twisted toward the front of the vehicle, with both ends mounted on the mounting member, and the impact-absorbing member may be inserted in and integrally connected with the first support bracket and the second support bracket.

The impact-absorbing member may have a predetermined curvature.

The impact-absorbing member may have an arc shape.

The impact-absorbing member may be connected to a fender apron extending in the length direction of the vehicle, above the side member in the height direction of the vehicle.

According to the device to absorb frontal collision impact of an exemplary embodiment of the present disclosure, the impact-absorbing structures are mounted on the side member to protrude out of the covering areas of the bumper beam.

Therefore, when a vehicle makes a small offset collision with a struck object in the front area, the impact-absorbing structures is configured to prevent the struck object from being pushed into the interior of a vehicle.

Further, the impact-absorbing structures can effectively reduce and absorb impact energy caused by the struck object and appropriately distribute to other portions of vehicle body through the side members keeping passengers safe.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION OF THE EMBODIMENTS

Figure 1:
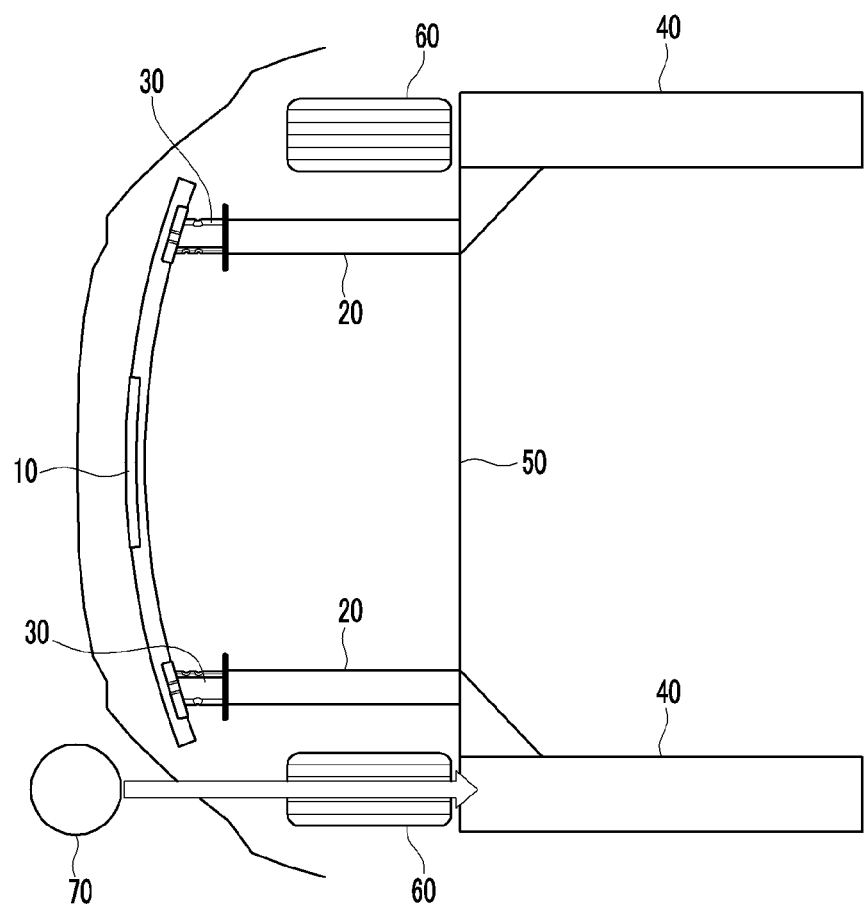
FIG. 1 is a schematic cross-sectional view of a front vehicle body of a vehicle equipped with a device for absorbing impact according to the related art.

Exemplary embodiments of the present invention will be described hereafter in detail with reference to the accompanying drawings. The examples of the present disclosure may, however, be embodied in different forms and should not be construed as limited to the examples set forth herein. Like reference numerals may refer to like elements throughout the specification.

Exemplary embodiments of the present disclosure will be described hereafter in detail with reference to the accompanying drawings.

Figure 2:
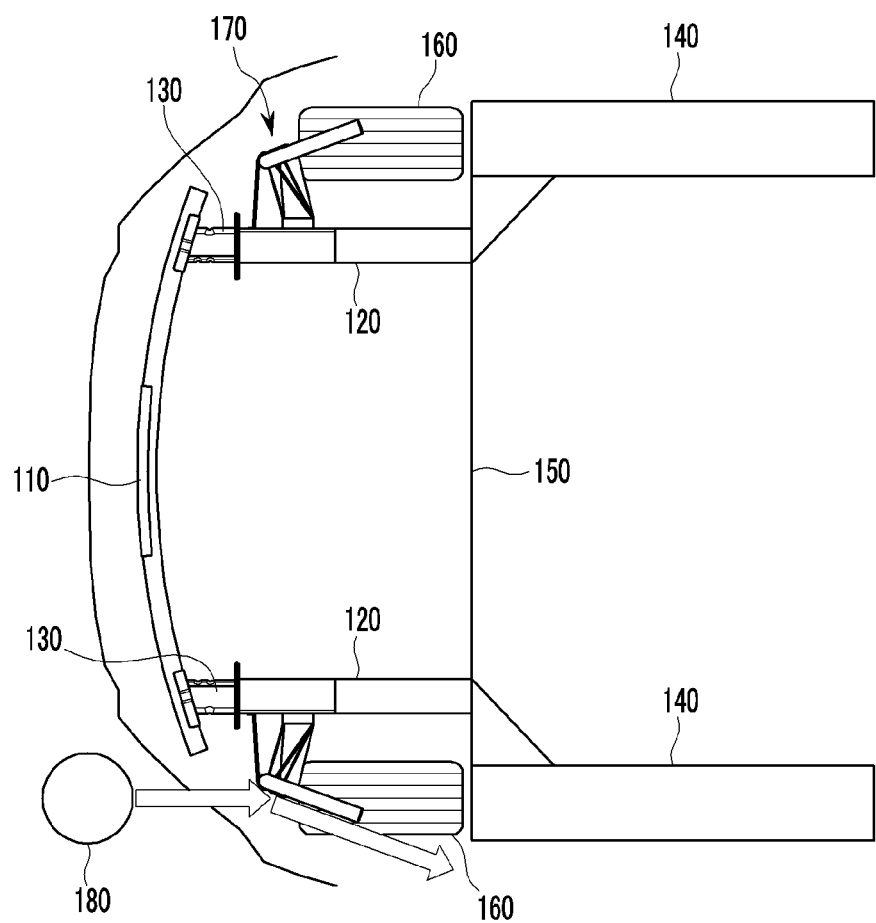
FIG. 2 is a schematic cross-sectional view of a front vehicle body of a vehicle equipped with a device for absorbing impact according to an exemplary embodiment of the present disclosure.
Figure 3:
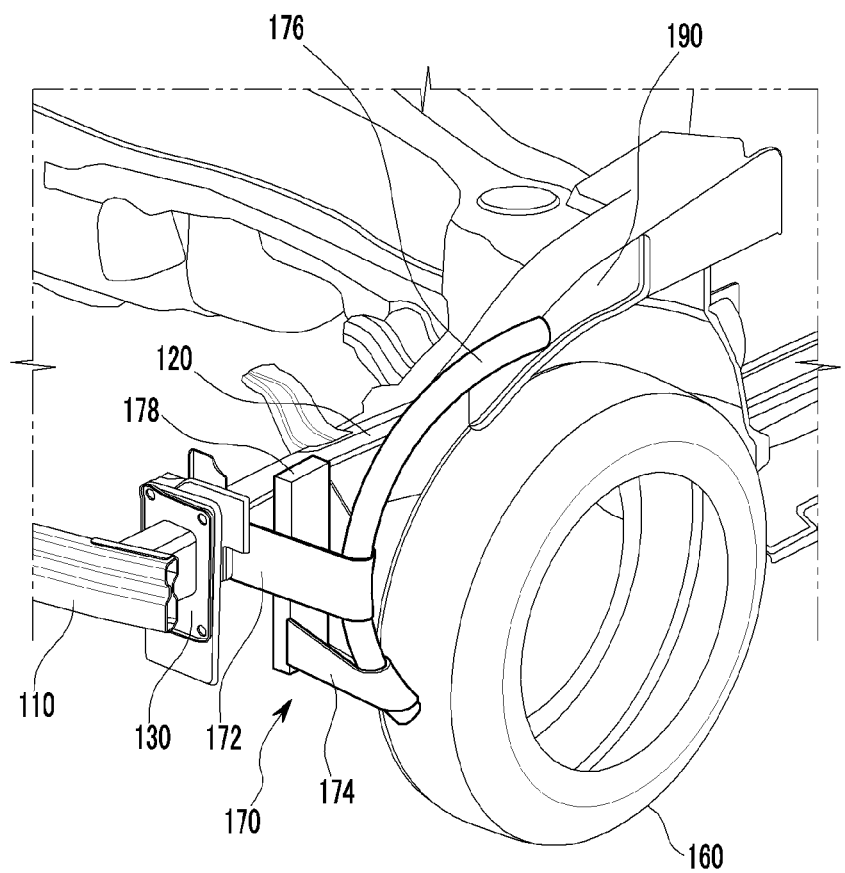
FIG. 3 is an exploded perspective view showing the device for absorbing impact, which is mounted on a vehicle according to an exemplary embodiment of the present disclosure.
Figure 4:
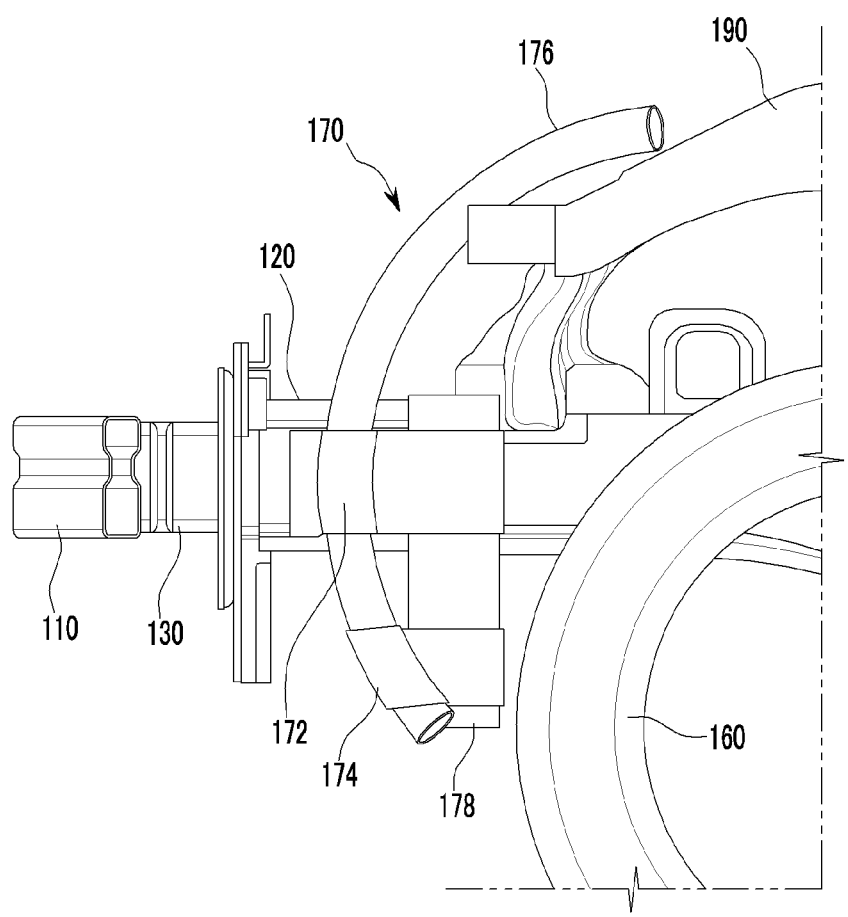
FIG. 4 is a side view showing the device for absorbing impact, which is mounted according to an exemplary embodiment of the present disclosure.
Figure 5:
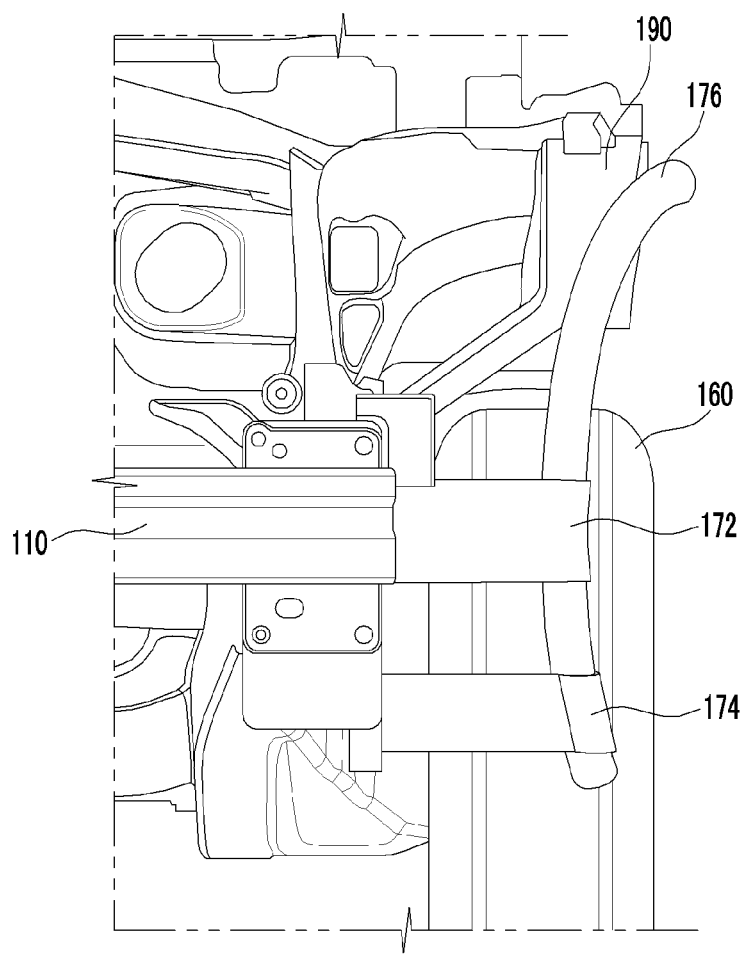
FIG. 5 is a front view showing the device for absorbing impact, which is mounted according to an exemplary embodiment of the present disclosure.
Figure 6:
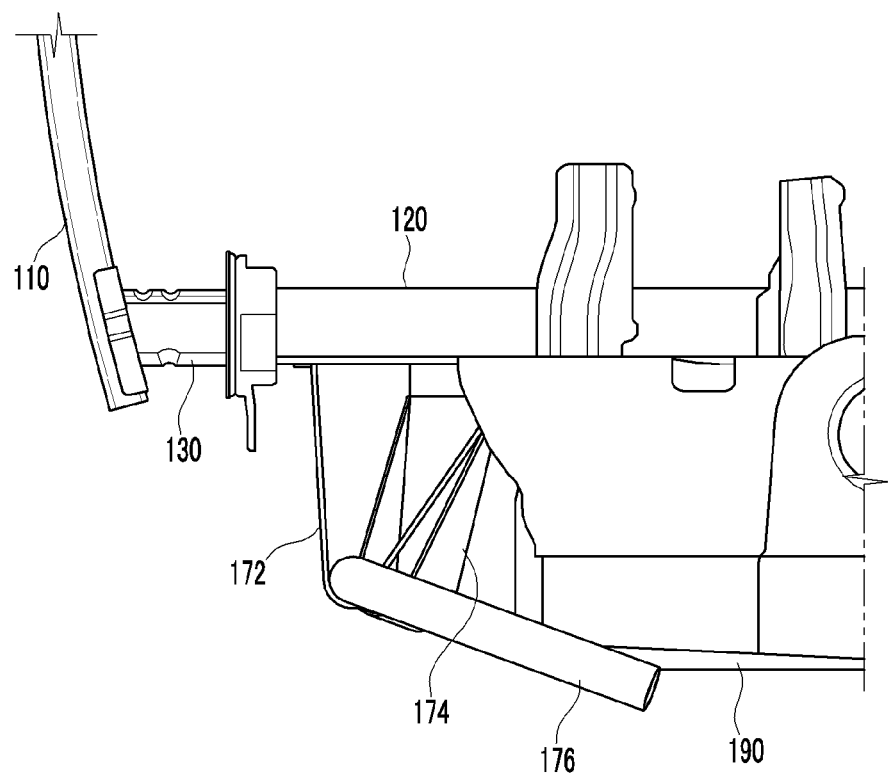
FIG. 6 is a top plan view showing the device for absorbing impact, which is mounted according to an exemplary embodiment of the present disclosure.

Referring to FIG. 2, a device to absorb impact for a vehicle includes a bumper beam 110 formed in a beam shape and disposed in the width direction on the front and the rear of a vehicle and crash boxes 130 to mount the bumper beam 110 on side members 120 extending in the length direction of the vehicle.

The side members 120 are connected with side reinforcing members 140 extending in the length direction of the vehicle and the side reinforcing members 140 are disposed further outside in the width direction of the vehicle than the side members 120.

A dash panel 150, extending in the width direction of the vehicle and dividing the engine room and the interior of the vehicle, is disposed at the joints of the side members 120 and the side reinforcing members 140.

Further, tires 160 wheels are disposed in the areas outside of bumper beam 110 in the width direction of the vehicle, between the side reinforcing members 140 and the side members 120 in the width direction of the vehicle.

Impact-absorbing structures 170 according to an exemplary embodiment of the present disclosure are disposed in the outside areas between the side members 120 and the tires 160 of the wheels.

The impact-absorbing structures 170 are mounted on the side members 120 in front of the tires 160 in the length direction of the vehicle, protruding outward further than the bumper beam 110 in the width direction of the vehicle.

Accordingly, when the vehicle makes a small offset collision with a struck object 180 such as a barrier while the vehicle is traveling forward, the struck object 180 hits the impact-absorbing structure 170 out of the covering areas of the bumper beam 110 and is pushed outward in the width direction of the vehicle, as indicated by an arrow (see FIG. 2), by hit-resistance of the impact-absorbing structure 170.

Therefore, a direct hit of the struck object 180 on the tire 160 and/or the side reinforcing member 140 is prevented, and large hit deformation of the tire 160 of the wheel and/or the side reinforcing member 140 is prevented, which keep passengers safe.

Further, the impact energy applied on the impact-absorbing structure 170 from the struck object 180 is primarily absorbed and reduced by the impact-absorbing structure 170 and distributed to other portions through the impact-absorbing structure 170 and the side member 120 keeping passengers safe.

Referring to FIGS. 3, 4, 5, and 6, the impact-absorbing structures 170 include a first protrusion that is mounted on the side member 120 and protrudes in the width direction of the vehicle, a second protrusion that protrudes behind the first protrusion in the length direction of the vehicle, and an impact-absorbing member that connects the first protrusion with the second protrusion and protrudes rearward further than the second protrusion in the length direction of the vehicle.

The first protrusion and the second protrusion are connected by a mounting member mounted on the side member 120.

The first protrusion is implemented by a substantially triangular first support bracket 172 with one end mounted on the mounting member and the other end mounted on the side member 120.

The second protrusion is implemented with a second support bracket 174 twisted toward the front of the vehicle and located below the first support bracket 172, with both ends being mounted on the mounting member.

The second support bracket 174 improves an elastic support force by twisting toward the front of the vehicle.

The impact-absorbing member 176 is integrally connected with the first support bracket 172 and the second support bracket 174.

The impact-absorbing member 176 is formed in a tube shape with a predetermined curvature.

The impact-absorbing member 176 may be formed in an arc shape.

A predetermined curvature of the impact absorbing member allows absorbing impact energy in a frontal collision of a vehicle by bending toward the front of a vehicle, which can cope with a collision while effectively absorbing impact energy.

The mounting member 178 has a substantially rectangular block shape.

The upper portion of the impact-absorbing member 176 may be connected directly to a fender apron 190 by welding or connected by an appropriate bracket.

The fender apron 190 extends in the length direction of the vehicle, above the side member 120 in the height direction of the vehicle.

The impact-absorbing structure 170 can be used for almost all of vehicles by appropriately adjusting the curvature of the impact-absorbing member 176 or the protruding lengths of the first support bracket 172 and the second support bracket 174. The performance against a collision of the impact-absorbing structure 170 can also be easily adjusted.

While the present disclosure has been described in connection with what is presently considered to be practical exemplary embodiments, it is to be understood that the present disclosure is not limited to the disclosed embodiments, but is intended to cover various modifications and equivalent arrangements included within the spirit and scope of the appended claims.

What is claimed is:

1. A device for absorbing frontal collision impact for a vehicle, the device comprising:
   side members extending in the length direction of a vehicle; and
   impact-absorbing structures mounted on the side members and protruding outward in the width direction of the vehicle,
   wherein the impact-absorbing structures each include:
      a first protrusion mounted on the side member and protruding in the width direction of the vehicle;
      a second protrusion protruding behind the first protrusion in the length direction of the vehicle; and
      an impact-absorbing member connecting the first protrusion with the second protrusion and protruding rearward further than the second protrusion in the length direction of the vehicle,
   wherein the impact-absorbing member is a tube shaped bar and has a predetermined curvature,
   wherein the first protrusion and the second protrusion are connected by a mounting member mounted on the side member,
   wherein the first protrusion includes a triangular first support bracket with one end mounted on the mounting member and the other end mounted on the side member,
   wherein the second protrusion includes a second support bracket twisted toward the front of the vehicle and below the first protrusion, with both ends mounted on the mounting member, and
   wherein the impact-absorbing member is inserted in and integrally connected with the first support bracket and the second support bracket.

2. The device of claim 1, wherein the impact-absorbing structures are disposed ahead of tires of wheels in the length direction of the vehicle.

3. The device of claim 1, wherein the impact-absorbing structures protrude outward further in the width direction of the vehicle than a bumper beam which extends in the width direction of the vehicle.

4. The device of claim 1, wherein the impact-absorbing member has an arc shape.

5. The device of claim 1, wherein the impact-absorbing member is connected to a fender apron extending in the length direction of the vehicle, above the side member in the height direction of the vehicle.

6. The device of claim 1, wherein the impact-absorbing member includes at least one free end.

7. The device of claim 1, wherein the impact-absorbing member extends in a direction which transverses a plane defined by the length and height directions of the vehicle.

8. The device of claim 1, wherein at least one of the first protrusion or the second protrusion extends away from the side member, wraps around the impact-absorbing member, and extends back toward the side member.

* * * * *